United States Patent [19]

Doieg

[11] 4,151,814
[45] May 1, 1979

[54] FUEL AND WATER INJECTION STEPPED PISTON INTERNAL COMBUSTION ENGINE

[76] Inventor: Gardner J. Doieg, P.O. Box 29461, Presidio Sta., San Franciso, Calif. 94129

[21] Appl. No.: 897,035

[22] Filed: Apr. 17, 1978

[51] Int. Cl.² .............................................. F02D 19/00
[52] U.S. Cl. .................................. 123/25 C; 123/65 S
[58] Field of Search ................. 123/25 B, 25 C, 25 D, 123/25 P, 32 B, 59 B, 59 BS, 65 S, 193 CH, 193 H, 193 P

[56] References Cited

U.S. PATENT DOCUMENTS

| | | | |
|---|---|---|---|
| 704,995 | 7/1902 | Weiss | 123/25 C |
| 713,366 | 11/1902 | Wallmann | 123/25 D |
| 861,411 | 7/1907 | Weiss | 123/25 D |
| 1,197,546 | 9/1916 | Rogers | 123/25 C |
| 1,261,779 | 4/1918 | Dempsey | 123/25 C |
| 1,676,264 | 7/1928 | Hill | 123/25 D |
| 1,727,860 | 9/1929 | Carlson | 123/25 C |
| 1,988,309 | 1/1935 | Ford | 123/25 D |
| 4,069,794 | 1/1978 | Jordan | 123/59 BS |

*Primary Examiner*—Ira S. Lazarus
*Attorney, Agent, or Firm*—Browdy and Neimark

[57] ABSTRACT

An internal combustion engine having a power generating assembly consisting of a piston with a top step, in a similarly-shaped cylinder. This defines a reduced top compression chamber into which fuel is injected and wherein combustion takes place due to the heat of air compressed therein. Water is injected through the top wall of the normal-sized lower cylinder portion, and as the top step of the downwardly moving piston clears this wall, the water is converted into steam. An exhaust duct is connected to the intermediate portion of the cylinder and an air admission duct is connected to the lower portion of the cylinder. When the downwardly-moving piston passes the exhaust port and the air admission port, air intake and scavenging take place. The top step of the piston thus acts as a water admission valve for admitting water to be vaporized into steam into the combustion space.

8 Claims, 3 Drawing Figures

FUEL AND WATER INJECTION STEPPED PISTON INTERNAL COMBUSTION ENGINE

FIELD OF THE INVENTION

This invention relates to internal combustion engines, and more particularly to power generating assemblies for internal combustion engines of the type employing an admixture of water vapor with the normal fuel-air mixture.

BACKGROUND OF THE INVENTION

The concept of injecting water into the combustion space of an internal combustion engine to form steam which can be used as a working fluid in cooperation with the gaseous products of combustion has been long known and used in the prior art. In general, the concept has involved injecting the water into the combustion space when the piston has already started to move through its power or expansion stroke and at a time when the piston is relatively hot, so as to immediately convert the water into steam. The contact of the water with the piston head also assists in cooling the piston, which is important, particularly with pistons of large diameter. In addition, the insertion of water into the cylinder to form steam, at the proper time, promotes more complete combustion of the fuel, thereby avoiding or limiting the formation of carbon. Also, the presence of the steam in the cylinder has been found to improve quietness of operation and fuel economy.

In the previously employed engines of this type, it has been found that in order to prevent or minimize interference with fuel combustion, the timing of the water injection is quite critical, and there is a necessity for accurately controlling the point at which the water is injected after the beginning of the power or expansion stroke of the associated piston. In the previously used systems, accurately machined cams, rocker arm assemblies, and other complex mechanisms have been employed to time and suitably delay the water injection. These devices are quite expensive, are subject to malfunction due to wear or vibration, and require a high degree of careful maintenance. Due to the extra moving parts involved, the associated engines are quite noisy, and extra lubrication is required to insure smooth operation. Therefore, improvement and simplification of the water injection timing means would be definitely advantageous in this art.

The present state of the art appears to be well illustrated by the following prior U.S. Pat. Nos., found as a result of a preliminary search:
Weiss, 704,995;
Rogers, 1,197,546;
Dempsey, 1,261,779;
Carlson, 1,727,860;
Kroll, 3,990,408;
Sanda et al, 4,063,536.

SUMMARY OF THE INVENTION

Accordingly, a main object of the present invention is to provide a novel and improved internal combustion engine of the type employing water injection, which overcomes the deficiencies and shortcomings of the previously employed engines.

A further object of the invention is to provide an improved internal combustion engine power generating assembly of the water injection type which provides more positively controlled water injection means than has been employed in the previous engines of this type.

A still further object of the invention is to provide an improved internal combustion engine of the type employing water injection, utilizing a stepped piston to provide reliably accurate timing of the delivery of the water to the heated piston head, instead of relying on complex cam and rocker arm mechanisms for such timing, and which does not interfere with fuel combustion.

A still further object of the invention is to provide an improved internal combustion engine of the type employing water injection for utilizing steam as a working fluid in cooperation with the gaseous products of combustion, whereby to give better fuel economy, higher power capacity, reduction in noise, and substantial decrease in pollution of the atmosphere, the improved engine including relatively simple and positive means for controlling the effective timing of injection of the water into the fuel combustion space.

A still further object of the invention is to provide an improved internal combustion power generating assembly of the water injection type which employs a stepped piston defining a water admission valve for admitting water to be vaporized into the combustion space at a positively predetermined point in the expansion stroke of the associated piston, said admission assuring non-interference with fuel combustion, promoting complete and economical fuel usage, minimizing atmospheric pollution, and providing high engine efficiency.

BRIEF DESCRIPTION OF THE DRAWINGS

Further objects and advantages of the invention will become apparent from the following description and claims, and from the accompanying drawings, wherein:

DESCRIPTION OF A PREFERRED EMBODIMENT

Figure 1:
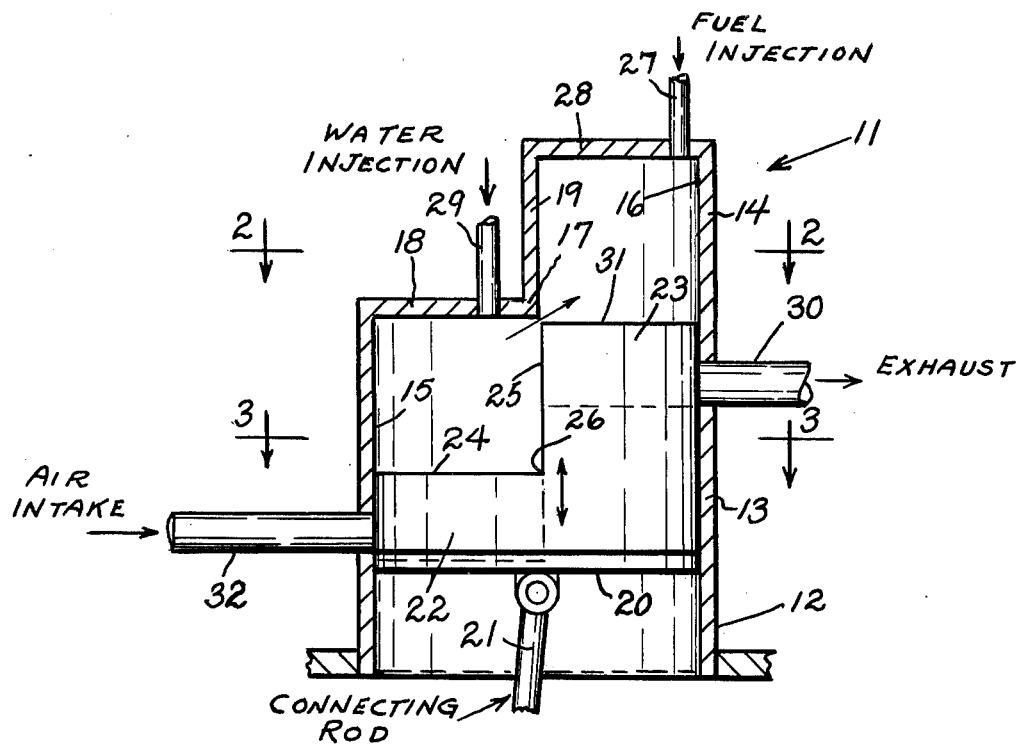
FIG. 1 is a vertical cross-sectional view taken through an improved internal combustion, water injection, power generating assembly constructed in accordance with the present invention.
Figures 2, 3:
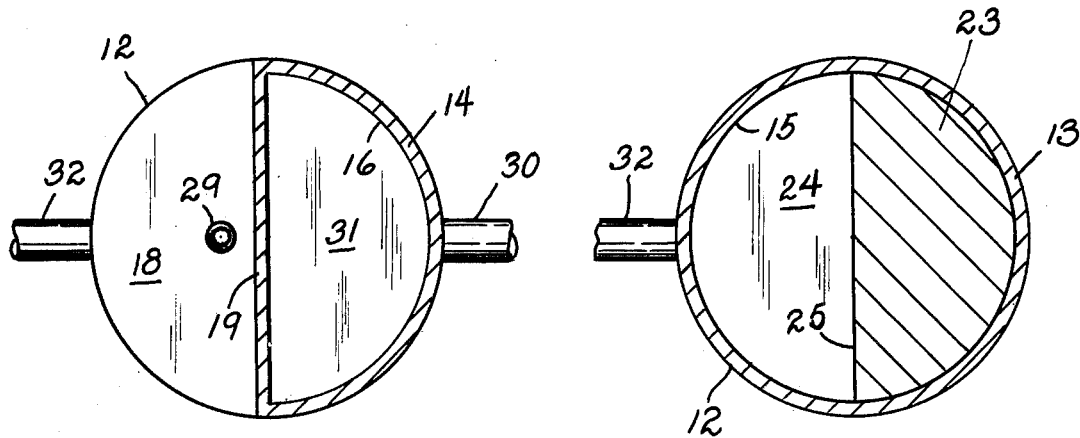
FIG. 2 is a horizontal cross-sectional view taken substantially on line 2—2 of FIG. 1.
FIG. 3 is a horizontal cross-sectional view taken substantially on line 3—3 of FIG. 1.

Referring to the drawings, 11 generally designates a power generating assembly for an internal combustion engine, in accordance with the present invention. The engine may be of the Diesel type wherein combustion takes place in a cylinder from the heat developed by the intense compression of air in the cylinder.

The assembly 11 comprises a working chamber 12 having the full-cylindrical main portion 13 and the half-cylindrical top portion 14, defining a cylindrical main bore 15 and a half-cylindrical top bore 16, as shown in FIG. 1, with a right-angled step 17 between the semi-circular top wall 18 of main bore 15 and the diametral flat wall 19 of top bore 16.

A reciprocatory working piston 20 is provided in the chamber 12, said piston being drivingly connected in a conventional manner to a crank element, not shown, of the engine crankshaft by a connecting rod 21.

Piston 20 has the full-cylindrical lower portion 22 slidably and sealingly engaging in main bore 15 and the half-cylindrical top portion 23 slidably and sealingly engageable in the half-cylindrical top bore 16. Thus, the piston is stepped to define a semi-circular top surface 24 for lower piston portion 22 and a diametral flat piston surface 25 rising from the step corner 26, said flat surface 25 being at times slidably and sealingly engageable with flat wall 19.

A pressurized-fuel injection conduit 27 is connected to the semi-circular top wall 28 of bore 16 and a pressurized-water injection conduit 29 is connected to the downwardly-offset semi-circular top wall 18 of main bore 15. An exhaust conduit 30 is connected to the intermediate portion of working chamber 12 at a level located just above the lowermost position of the semi-circular top surface 31 of the semi-cylindrical top piston portion 23. An air intake conduit 32 from a suitable air source is connected to the lower portion of the main cylinder member 13 at a level located just above the lowermost position of semi-circular flat piston surface 24. Thus, conduits 32 and 30 are located so as to be connected to bore 15 substantially simultaneously responsive to completion of the downward stroke of the piston 20.

Suitable conventional cam-controlled means, not shown, may be provided to inject fuel into bore 16 through conduit 27 at the full top stroke position of piston 20 and to inject water through conduit 29 into bore 15 on the downstroke of said piston just as, or slightly before, flat surface 25 fully clears flat wall 19. Said cam-controlled means, for example, may be similar to that employed in the U.S. Pat. No. 1,727,860 to C. A. Carlson. Thus, water is injected when the piston has moved through the first part of its expansion or power stroke.

In operation, air enters bore 15 when the lower step 22 of piston 20 clears the port defined by air conduit 32 at the end of the downward, or expansion, stroke of said piston. On the ensuing upstroke, air is compressed ahead of piston 20, and ahead of piston step portion 23 in semi-cylindrical bore 16. At the top of the full compression stroke, fuel is injected through conduit 27 into bore 16. Ignition results because of the heat generated by the compressed air. This causes combustion of the fuel and air mixture and drives the piston downwardly. On the downstroke, when surface 25 clears the step corner 17, water is injected from bore 15 into the expanding hot gases, being converted to steam and generating additional expansive force by such conversion. When piston portion 23 descends below the port defined by exhaust conduit 30 at the bottom of the downward stroke, air intake from conduit 32 and scavenging take place, whereby the exhausted gaseous products of combustion discharge from bore 15 through the exhaust conduit 30 simultaneously with the fresh entry of air into bore 15 from the conduit 32.

The power generating assembly 11 thus operates as a two-cycle piston and cylinder.

The instant formation of high pressure steam provides secondary, or auxiliary, expansive power, which even may constitute the major component of the generated engine power, and which therefore provides added driving force on both the upper piston surface 31 and the lower piston surface 24 simultaneously. This added power reduces the Diesel fuel intake requirements because it improves the engine efficiency, and the reduction of required combustion of hydrocarbon fuel and substitution of steam serve to substantially reduce the resultant pollution of the atmosphere.

It will be noted that the valving cooperation of flat surface 25 with flat wall 19 gives positive control of the timing of the injection of water into the combustion chamber 16 and assures that combustion of the fuel-air mixture is well under way before water injection takes place. This positively prevents the injected water from prematurely quenching the burning gases. Also, the above-described configuration greatly reduces the degree of precision required for the external water injection control mechanism and allows the engine to operate efficiently even when the external water injection control mechanism becomes somewhat worn.

While a specific embodiment of an improved internal combustion engine power generating assembly has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

I claim:

1. A power generating assembly for an internal combustion engine comprising a working chamber having a stepped longitudinal contour including a full-area main portion and a reduced-area outer portion, said outer portion defining an air-compression, and fuel combustion space, a reciprocatory piston in the working chamber having a stepped longitudinal contour shaped to slidably interfit with the stepped contour of the working chamber, power-transmitting means connected to said piston, fuel injection conduit means communicatively connected to said reduced-area outer working chamber portion, water injection conduit means communicatively connected to the main portion of the working chamber adjacent to the step thereof, air intake conduit means communicatively connected to said working chamber main portion at a location proximal to the piston step such as to allow air to enter said working chamber at said piston step substantially at the end of a piston power stroke, and exhaust means communicatively connected to said working chamber at a location such that it is blocked by the piston except at the end of said power stroke.

2. The power generating assembly of claim 1, and wherein the step of the working chamber and the step of the piston have cooperating longitudinally extending sliding valve surfaces which separate at a predetermined point of said power stroke to allow injected water to pass from said working chamber main portion to said reduced-area outer working chamber portion to be converted into steam for driving the piston.

3. The power generating assembly of claim 2, and wherein said piston includes a full-area main portion slidably fitting the main portion of the working chamber and a reduced outer piston portion slidably and conformably receivable in the reduced-area outer portion of the working chamber.

4. The power generating assembly of claim 3, and wherein the full-area main piston portion is cylindrical and the reduced outer piston portion is substantially semi-cylindrical.

5. The power generating assembly of claim 3, and wherein said cooperating longitudinally extending sliding valve surfaces are located substantially in a central longitudinal plane of the working chamber.

6. The power generating assembly of claim 3, and wherein the full-area main piston portion is cylindrical and the reduced outer piston portion is substantially semi-cylindrical and said cooperating longitudinally extending valve surfaces are located substantially in a common diametral plane of said main piston portion.

7. The power generating assembly of claim 6, and wherein said main working chamber portion has a substantially semi-circular outer wall, and wherein said water injection conduit means is connected to the main working chamber portion at said substantially semi-circular outer wall.

8. The power generating assembly of claim 7, and wherein said reduced-area outer working chamber portion has a substantially semi-circular outer wall and said fuel injection conduit means is connected to said outer working chamber portion at said last-named substantially semi-circular outer wall.

* * * * *